(12) United States Patent
Knappmiller

(10) Patent No.: US 6,935,360 B2
(45) Date of Patent: Aug. 30, 2005

(54) FIRE HYDRANT PROTECTIVE COVER AND VISIBILITY MARKER

(76) Inventor: Leonard V. Knappmiller, P.O. Box 136, Center Rutland, VT (US) 05736

( * ) Notice: Subject to any disclaimer, the term of this patent is extended or adjusted under 35 U.S.C. 154(b) by 175 days.

(21) Appl. No.: 10/673,765

(22) Filed: Sep. 29, 2003

(65) Prior Publication Data

US 2005/0067014 A1 Mar. 31, 2005

(51) Int. Cl.[7] .................. E03B 9/06; F16K 27/06; F16K 27/12
(52) U.S. Cl. ............ 137/296; 137/377; 137/382; 220/724
(58) Field of Search .................. 137/296, 364, 137/371; 220/724

(56) References Cited

U.S. PATENT DOCUMENTS

| 565,013 | A | * | 8/1896 | Moodie | 137/296 |
| 613,652 | A | * | 11/1898 | Chadbourne | 137/371 |
| 1,105,040 | A | * | 7/1914 | Paulus | 137/296 |
| 1,370,207 | A | * | 3/1921 | Haase | 220/8 |
| 2,869,576 | A | * | 1/1959 | Kennedy | 137/296 |
| 5,664,597 | A | * | 9/1997 | Miskiewicz | 137/296 |
| 5,899,222 | A | * | 5/1999 | Gencarelli | 137/294 |
| 6,536,462 | B1 | * | 3/2003 | Laugen | 137/296 |

FOREIGN PATENT DOCUMENTS

| DE | 470266 | * | 1/1929 | | 137/296 |
| DE | 692547 | * | 6/1940 | | 137/296 |
| DE | 734267 | * | 4/1943 | | 137/296 |
| DK | 59745 | * | 4/1942 | | 137/296 |

* cited by examiner

Primary Examiner—George L. Walton
(74) Attorney, Agent, or Firm—Kevin Ellicott, Esq

(57) ABSTRACT

A fire hydrant protective cover and visibility marker comprising a hollow body having an interior space, a cap portion, middle portion and bottom portion, the bottom portion having an opening for accessing the interior space.

3 Claims, 5 Drawing Sheets

FIRE HYDRANT PROTECTIVE COVER AND VISIBILITY MARKER

FEDERALLY SPONSORED RESEARCH AND DEVELOPMENT

There are no federally sponsored or funded research or development projects or undertakings in any way associated with the instant invention.

CROSS REFERENCE TO OTHER APPLICATIONS

This is the first submission of an application for this article of manufacture. There are no other applications, provisional or non provisional.

BACKGROUND OF THE INVENTION

1. Field of the Invention

The instant invention relates to that field of devices consisting of articles of manufacture known as protectors and visibility markers. Specifically, the instant invention is a fire hydrant protector and marker.

2. Background Information

The prior art known to the Inventor discloses that various forms of protective containers and visibility markers are well known throughout the arts. Such protective containers are manufactured to serve a wide variety of uses, from the most generic, such as a cardboard box or thin sheet-like flexible bag, to complicated and use specific, such as form fitted locking cases for hand guns and rifles. Furthermore, visibility markers are also quite well known, and include simple examples such as a brightly colored stick or a rod with a plastic light reflective medallion mounted thereto, to more complicated examples such as steel towers festooned with flashing lights near aviation landing strips.

Perhaps of most particular relevance are the partially open protective containers used frequently in geographical regions where there are significant amounts of winter snowfall. In their most common example, these are essentially a "lean to" which is little more than a pair of wooden boards or planks set over a shrubbery or sapling such that together they form an inverted "V" shape, the peak of which is located above the topmost portion of the tree or shrubbery. A winter snow protective lean-to such as this is used most often to prevent heavy winter snow from completely covering the plant and potentially crushing or otherwise deforming its shape over the course of the winter.

The instant invention is a protective cover and visibility marker for use on fire hydrants, especially during the winter months in areas where winter snow is often of significant accumulated depths such that the fire hydrant may become covered by that snow. In the prior art known to the Inventor, there has been absolutely no attempt made to prevent these fire hydrants from becoming covered by snow, and only the most rudimentary attempts to mark them with visibility markers in those instances in which they have become covered. These rudimentary attempts are best known by the use of a painted stick or rod having some form of visibility device (a reflective badge, for example) which is shoved into the snow in close proximity to the fully buried fire hydrant.

The reason for desiring a marker in close proximity to the buried fire hydrant is also well known. During winter months, in places where snow accumulation is significant enough to cover a ground mounted (for example, located on a side walk, along side a road) fire hydrant, it is common to use a mechanical snow plow to move that snow off the street and permit the freer and easier flow of motor vehicle traffic. However, many mechanical snowplows are mounted onto motor vehicles including trucks such that the blade of the snowplow reaches either over or extremely close to the sidewalk. It is not unusual during winter months for the snowplow to hit sidewalk-mounted articles such as street sign poles and the like. And while a bent street sign pole is an unnecessary and unwanted cost due to its required replacement after the snow melts, it does not constitute the sort of hazard and potentially life threatening danger that striking a buried fire hydrant can cause.

In the event that a fire hydrant is damaged by a mechanical snowplow, water flowing at a significant rate and under significant pressure is released from the hydrant, and flows into the surrounding environment. In winter months, this water may freeze quite quickly, resulting in slippery and dangerous conditions for both motor vehicles and pedestrians alike. Furthermore, a damaged fire hydrant is temporarily unusable for its intended purpose (providing a water source for extinguishing near by fires) until it has either been repaired or replaced. This means that for the period of time the hydrant is unusable, buildings and structures in the vicinity are at increased risk of burning to the ground, with the attendant possible loss of human life.

Finally, it is well known among those who must use fire hydrants during emergencies ("firefighters" and other fire suppression personnel) that the accumulation of snow on and about fire hydrants causes delays in utilizing the fire hydrant in an emergency. First, the precise location of the hydrant must be determined when it is covered in snow. Next, the hydrant must be dug out from under the snow before it can be used. And given that most hydrants include connection points which extend outwardly and away from the usually cylindrical body of the fire hydrant, it is necessary to dig not only through the snow to the hydrant itself, but to clear a sufficient area radially away from the hydrant such that the connection points are unobstructed by the snow.

To date, it has simply been a fact of life that fire hydrants are often difficult to locate and access in areas of significant snow accumulation. No attempt has been made thus far to remedy this particular problem in a way that recognizes not only the need to locate the hydrant, but to prevent the build up of snow so as to keep the connection points clear and accessible.

SUMMARY OF THE INVENTION

The instant invention is a protective cover and visibility marker for use with common street or sidewalk mounted fire hydrants. For the first time, it is possible to both keep such a fire hydrant clear and accessible in areas where significant winter snow fall occurs, and at the same time render the fire hydrant's location highly visible despite that accumulation of snow.

A first object of the instant invention, therefore, is to provide for a protective cover usable on a fire hydrant that will maintain easy accessibility of that fire hydrant even in the presence of accumulated snowfall.

This objective is accomplished by fabricating a free standing, generally tubular hollow sheathe of proportions and dimensions adequate for completely covering a fire hydrant.

This objective is further accomplished by fabricating the hollow sheathe in a form which includes a somewhat hemispherical top portion. The hemispherical top portion being of a diameter greater than the diameter of the hollow sheathe tending to discourage the piling up of snow around the base of the sheathe. This in turn leads to an area free of snow accumulation of sufficient dimensions so as to make fire hydrant connection points more accessible. Furthermore, this objective is accomplished by fabricating the hollow sheathe from a material which does not tend to stick or adhere to snow, thus making it easier to pull the sheathe free of snow which has accumulated against it.

A second objective of the invention is to provide visibility marker which makes location of a fire hydrant more expedient, even in areas where there is a significant accumulation of snow.

This objective is accomplished by fabricating a hollow sheath of dimension and proportions which will completely cover said fire hydrant, yet remain visible even in the presence of snow of significant depth.

A third objective of the invention is to provide visibility marker which visually indicates the presence of the fire hydrant, making it far less likely that even in the presence of a significant accumulation of snow, the fire hydrant will be struck and/or damaged by snow removal machinery such as snow plows.

This objective is accomplished by fabricating a hollow sheath of dimension and proportions which will completely cover said fire hydrant, yet remain visible even in the presence of snow of significant depth. The sheath is preferably manufactured having a color which provides contrast against the snow, such as red.

A DESCRIPTION OF THE DRAWINGS

A DESCRIPTION OF THE PREFERRED EMBODIMENT

Figure 1:
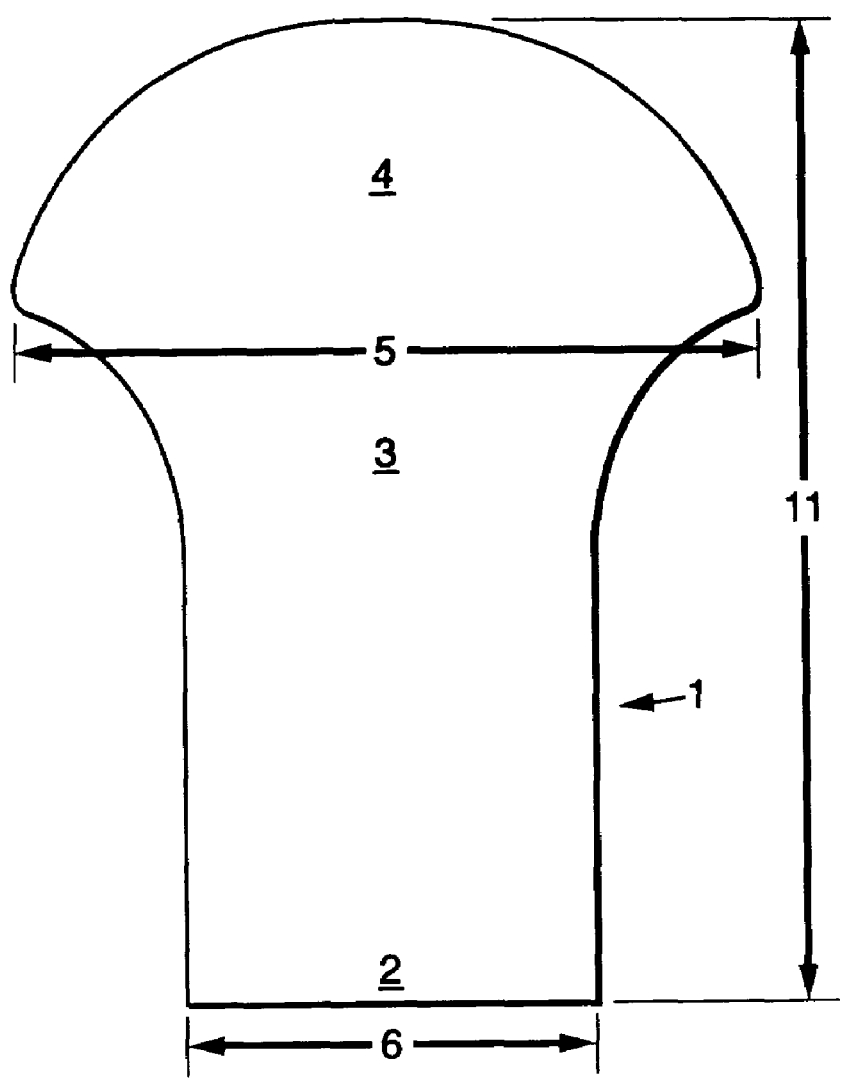
FIG. 1 is a side plan view of the preferred embodiment of the instant invention.
Figure 4:
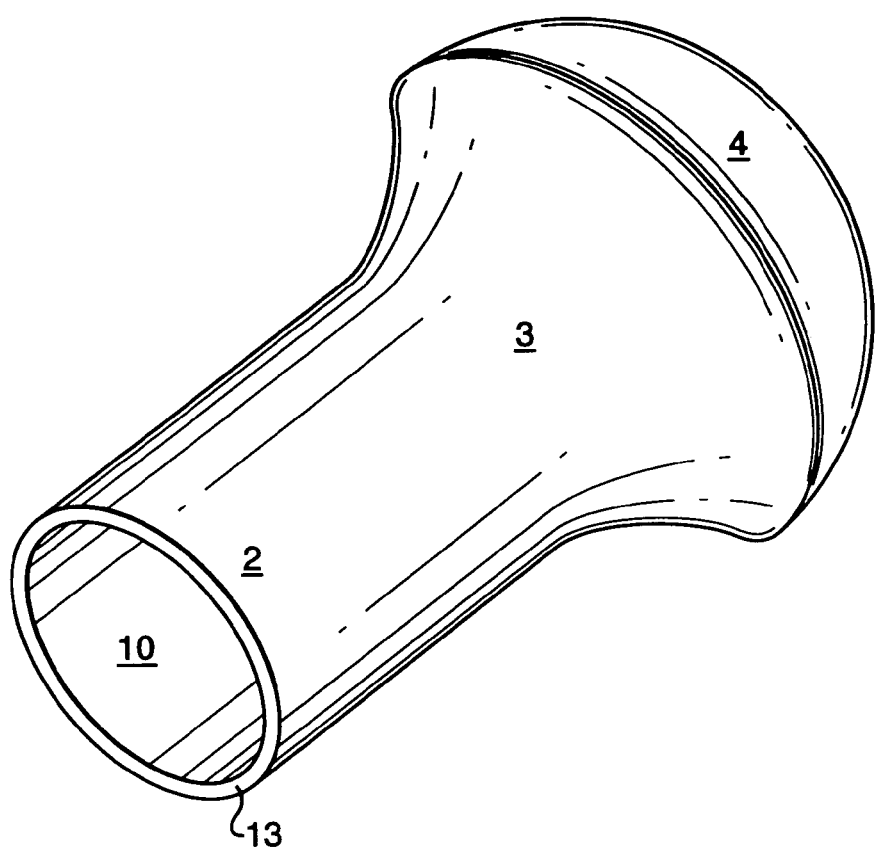
FIG. 4 is a perspective view of the preferred embodiment of the instant invention.

As per FIGS. 1 and 4, in the preferred embodiment, a fire hydrant protective cover and visibility marker includes a generally tubular or cylindrical body (1) having a bottom portion (2) a middle portion (3) and a cap portion (4).

The overall form of the device may be essentially "mushroom" shaped, with the cap portion diameter (5) being greater than the bottom portion diameter (6). In the preferred embodiment, the entire body (1) is hollow, having an interior space accessible through a bottom end opening (10).

Figure 2:
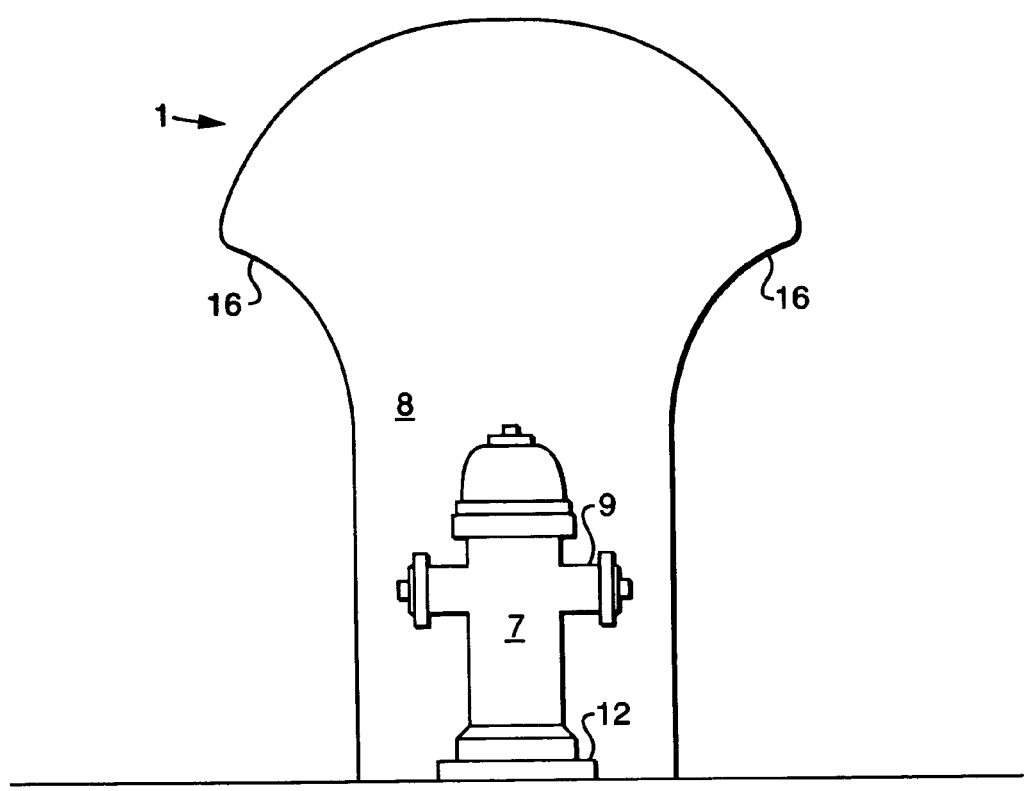
FIG. 2 is a cross sectional side view of the preferred embodiment of the instant invention including a fire hydrant.

As per FIG. 2, the preferred embodiment of the fire hydrant protective cover and visibility marker (1) is sized and shaped to be placed over and around a common ground mounted fire hydrant (7). The instant invention being hollow, the interior space (8) of the device completely engulfs the fire hydrant and prevents it from being directly contacted and covered by accumulating snow. Obviously the instant invention must be sufficiently large enough so that it may be placed over the top of, and slid down over the fire hydrant (7) without becoming caught, wedged or entangled by any valves or hose connection portions (9) the fire hydrant may possess or a radial flange (12) usually present at the base of the fire hydrant and used to attach the hydrant to a buried water line.

In the preferred embodiment, the bottom portion diameter (6) is approximately 2 feet (24 inches), and the cap portion diameter (5) is approximately 4 feet (48 inches). Obviously both of these dimensions are given merely to eliminate the necessity for undue experimentation when practicing the instant invention and may easily be modified to suit the user's particular needs. The bottom portion diameter (6) should further obviously be great enough to permit the device to be slid over the fire hydrant which is to be protected and allow the device to completely engulf said fire hydrant.

The instant invention obviously has a device height (11). The device height should be sized so that the fire hydrant to be protected is completely engulfed. In the preferred embodiment, the device height is approximately 5 feet (60 inches), though this measure may easily be modified to suit said fire hydrant's dimensions. Furthermore, it may be desirable to modify the device height to suit the particular snowfall accumulation condition of the location where the instant invention is to be used. For example, if one knows that snowfall accumulation, when plowed onto a sidewalk or street having said fire hydrant averages approximately 4 feet, it may be useful to provide for a device height of approximately 5 feet so that the cap portion (4) is exposed above the accumulated or plowed snow.

Finally, as the instant invention is hollow it obviously further includes a device thickness (13). The thickness of the instant invention should be great enough so that it does not collapse or deform under its own weight or any added weight of accumulated snowfall The thickness is clearly dependent to a large extent upon the material from which the instant invention is constructed. In the preferred embodiment, the instant invention is constructed of polyethylene (or other lightweight plastic), and has a thickness of 0.0625 inches. Obviously, if one uses a stiffer material, one could decrease the thickness and achieve the same result.

Figure 3:
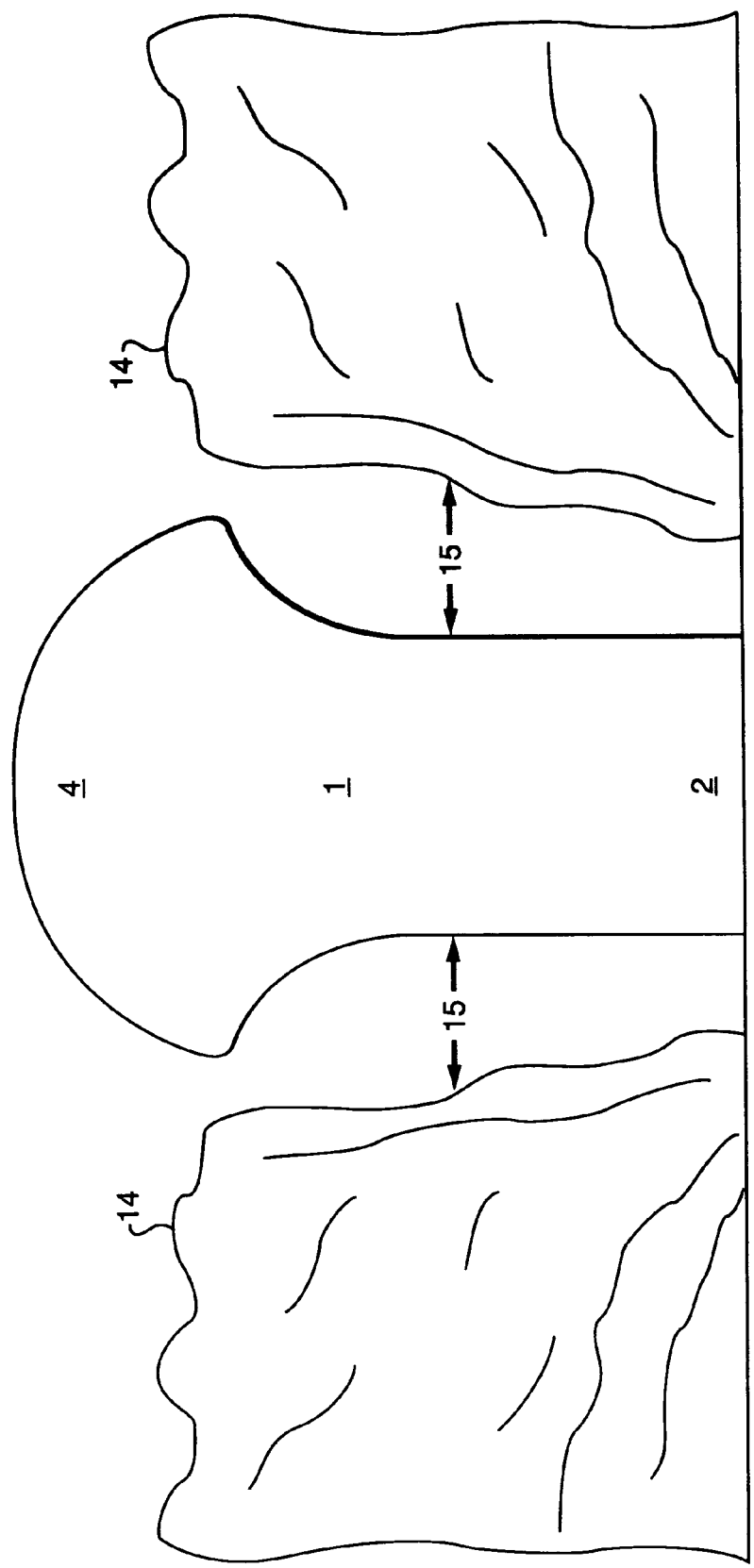
FIG. 3 is a perspective view of the preferred embodiment with accumulated snow present.

As per FIGS. 1 and 3, the use of the instant invention may now be completely understood. During the winter in many geographical locations, snowfall may accumulate on the ground. As the snow falls, the cap portion (4) of the instant invention will tend to prevent the snowfall from accumulating proximate to the bottom portion (2) due to the fact that the overall shape of the instant invention includes the cap portion diameter (5) being greater than the bottom portion diameter (6). This accumulated snow (14) will therefore tend not to accumulate too closely around the bottom portion (2), making removal of the instant invention from up and off the fire hydrant it engulfs much easier than if the device were merely cylindrical in shape. It should be quite apparent that by having the cap portion diameter (5) being greater than the bottom portion diameter (2) there will be a snow free area (15) extending radially from and around the instant invention. The snow free area should be approximately as great as the cap portion diameter (5).

Figure 5:
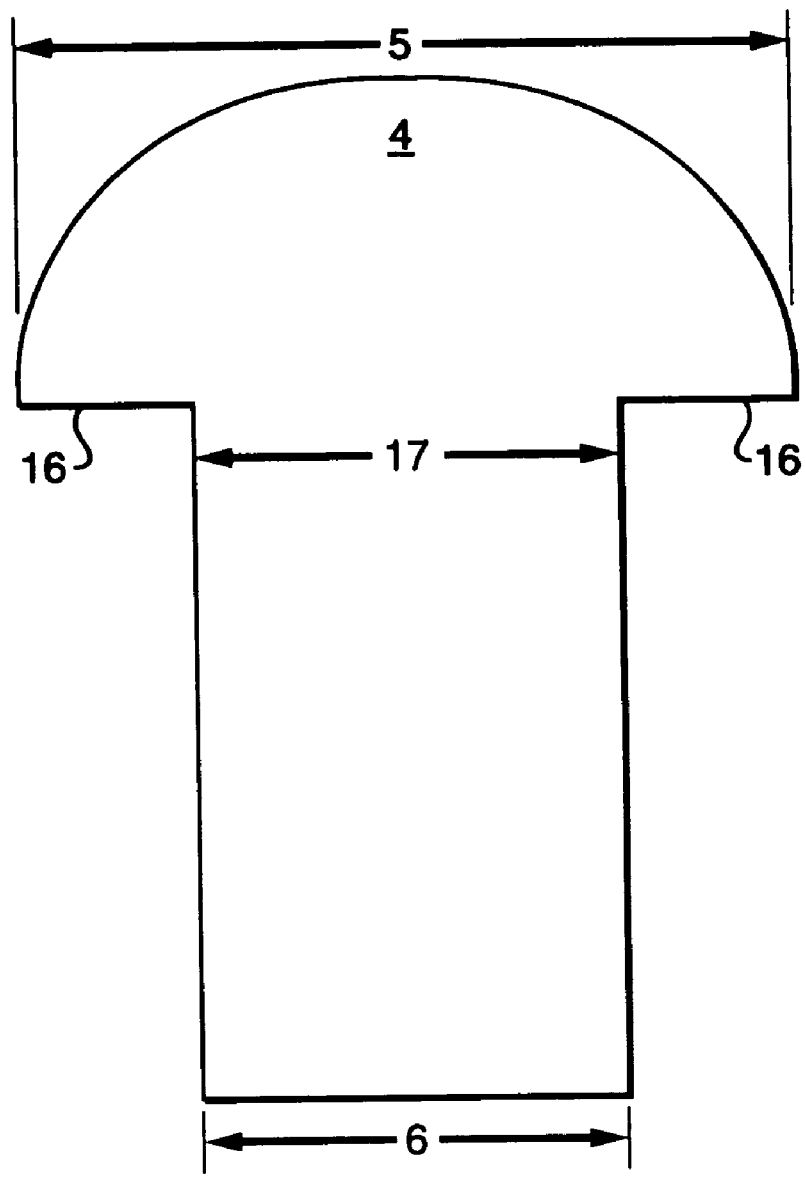
FIG. 5 is a side plan view of another embodiment of the instant invention.

Because the instant invention is essentially mushroom shaped with the cap portion being basically hemispherical, the instant invention may be easily removed from over the fire hydrant by grasping the instant invention under the cap portion at what may be called hand purchase portions (16). That is, the portion of the instant invention on its exterior which is the underside of the cap portion, proximate to where the cap portion merges into the middle portion (3). In the preferred embodiment, the middle portion gradually arcs outwardly, radially to transition between the bottom portion diameter (6) and the cap portion diameter (5). However, while this is a design preference of the preferred embodiment, it could just as easily be modified as per an alternative embodiment in FIG. 5 such that the bottom portion diameter (6) and a middle portion diameter (17) were equal, with the cap portion diameter (5) is greater than said middle and bottom portion diameters. In such a case, the hand purchase areas (16) would be generally flattened and more linear in form rather than arch shaped.

And while the overall device disclosed herein has been described as having the cap portion being generally hemispherical in form, the precise form may easily be modified to suit user and manufacturing convenience. It is believed that the generally hemispherical shape of the cap portion is preferred as snow which falls down upon the instant invention will be less likely to accumulate on the cap portion as gravity will tend to cause said snow to slide off the hemispherically shaped cap rather than simply accumulate upon it as would likely be the case with a cap portion being flattened or discoidally shaped.

Furthermore, while the bottom and middle portions may be described in the preferred embodiment as being essentially tubular or cylindrical, they could just as easily be constructed such that when viewed along a radial cross section they appeared as square or triangular or rectangular or oval or nearly any geometrical shape. The bottom portion and middle portion merely serve to engulf the fire hydrant to be protected and support the cap portion, and therefore the precise shape of that bottom/middle portions of the instant invention is relatively unimportant, so long as the desired coverage of said fire hydrant is obtained, and the cap portion is supported without the bottom or middle portion being deformed under the weight of the cap portion and any snow which might accumulate thereupon.

Finally, while being described as essentially hemispherical, it should be obvious that the cap portion could just as easily be conically shaped instead.

The instant invention is further made more visible not only by the form leading to snow not burying it, but by its coloration as well. In the preferred embodiment the instant invention is colored red. However, nearly any color which tends to visually contrast highly against snow (snow generally being white or perhaps a bit gray over time) would do equally well. Such other colors include but are not limited to yellow, green, blue, orange and violet. The "brighter" the color, the more likely the device is to be seen by those driving vehicles which could damage the covered fire hydrant on impact. So-called "dayglow" or fluorescent colors would be especially useful in this regard.

Finally, it may be desirable in some locations to include a metal chain which would be fastened to the instant invention and to the fire hydrant to prevent the instant invention from being stolen.

I claim:

1. A fire hydrant protective cover and visibility marker comprising;
   A. a hollow body having an interior space,
      I. the hollow body being sized and shaped to completely engulf a fire hydrant,
      II. the hollow body having hand purchase areas for easy removal of the hollow body from the fire hydrant,
      III. the hollow body having a bottom portion, a middle portion and a cap portion,
         a. the bottom portion having an opening for accessing the interior space,
         b. the bottom portion having a bottom portion diameter,
         c. the cap portion being hemispherical in shape for directing snow away from the bottom portion of the hollow body to prevent a snow build-up thereabout,
         d. the cap portion having a cap portion diameter,
            i. the cap portion diameter being greater than the bottom portion diameter.

2. A fire hydrant protective cover and visibility marker according to claim 1, further comprising;
   A. the bottom portion and middle portion being cylindrical in shape.

3. A fire hydrant protective cover and visibility marker according to claim 1, further comprising;
   A. the middle portion having a middle portion diameter,
      I. the middle portion diameter being equal to the bottom portion diameter.

* * * * *